Jan. 31, 1961

R. HOFER ET AL 2,970,282

MODULATOR CIRCUIT ARRANGEMENT

Filed Dec. 29, 1955

Inventors.
Rudolf Hofer &,
Hans Tropper.

By

Atty.

2,970,282
Patented Jan. 31, 1961

2,970,282

MODULATOR CIRCUIT ARRANGEMENT

Rudolf Hofer, Berlin-Siemensstadt, and Hans Tropper, Berlin-Halensee, Germany, assignors to Siemens & Halske Aktiengesellschaft, Munich and Berlin, Germany, a corporation of Germany Filed Dec. 29, 1955, Ser. No. 556,378

Claims priority, application Germany Dec. 31, 1954

1 Claim. (Cl. 332—38)

This invention is concerned with a modulation circuit arrangement for high-frequency transmitters, especially for the modulation of television transmitters with picture frequency mixtures, comprising a high-frequency amplifier tube connected as a load of a modulator tube and having as auxiliary load a rectifier which is biased by a voltage of such magnitude that the rectifier begins to pass current when the operatively effective working point of the high-frequency amplifier tube on the mutual conductance characteristic curve of the tube is within the range of reduced steepness of such curve.

Figure 1:
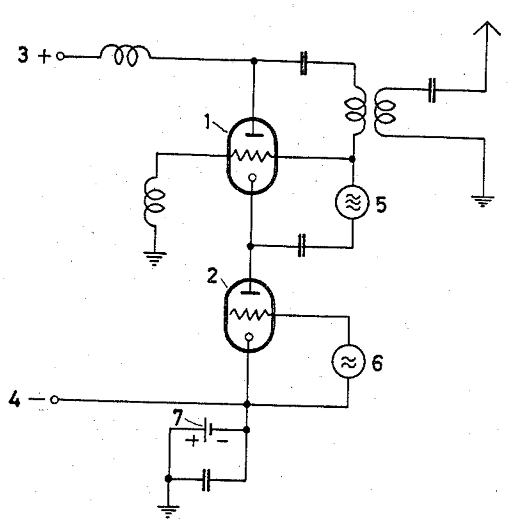
Figure 2:
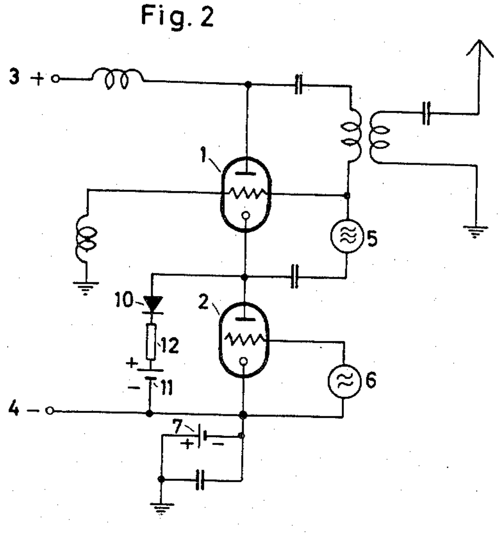

The various objects and features of the invention will appear from the description which is rendered below with reference to the accompanying diagrammatic drawing in which Fig. 1 shows an example of a modulation circuit for the modulation of television transmitters; and Fig. 2 shows an example of an embodiment of a circuit according to the invention.

For the modulation of high-frequency transmitters there are often used modulation circuits in which a high-frequency amplifier tube constitutes the load for a modulator tube. An example of such a modulation circuit, for example for modulating television transmitters with picture frequency mixtures, is shown in Fig. 1. The high-frequency amplifier tube 1 is connected in series with the modulator tube 2. The plate voltage connected between the points 3 and 4 is divided by the tubes 1 and 2. The control grid of the high-frequency amplifier tube 1 is supplied with the carrier frequency 5 and to the control grid of the modulator tube 2 is connected the picture frequency mixture 6. The voltage drop occurring at the tube 2 reaches the grid of the amplifier tube 1 together with a direct voltage from the source 7 and determines in this manner the conductance of the tubes 1 and 2.

This circuit arrangement which is being used with various modifications exhibits a drawback which becomes particularly troublesome in the case of television transmitters. The high-frequency amplifier tube 1 acts as a load impedance for the modulator tube 2. However, since the carrier varies in television transmitters between large and small values, the load impedance represented by the tube 1 does not remain constant due to varying mutual conductance along the characteristic curve of the tube. Since the load of the modulator tube 2 is not only formed by the actual impedance represented by the high-frequency amplifier tube 1 but in addition thereto by the unavoidable tube- and circuit-capacitance, there will result, between the large and small values of the carrier, a difference in the frequency course of the control operation.

The invention contemplates to avoid this disadvantage in a modulation circuit, especially in the modulation of television transmitters with picture frequency mixtures having a high-frequency amplifier tube as a load of a modulator tube, by the provision of a rectifier as an auxiliary load for the modulator tube which is biased by a voltage of such magnitude that the rectifier begins to pass current when the operatively effective working point of the high-frequency amplifier tube on the mutual conductance curve of the tube reaches the range of lesser steepness of such curve. The advantage thereby obtained is that the load on the modulator tube remains approximately constant.

An example of the invention is shown in Fig. 2 in which elements corresponding to those of Fig. 1 are indicated by like reference numerals. Between the plate and cathode of the modulator tube 2 is disposed the rectifier 10 lying in series with the opposing voltage 11 which is of such magnitude that the rectifier 10 passes increasingly more current the more the operation of the high-frequency amplifier tube 1 comes within the specified conductance range along the characteristic curve of the tube. A resistor 12 of a suitable value may be provided in order to affect the magnitude of the current flowing through the rectifier 10 so that the active part of the load resistance for the modulator tube 2 remains as constant as possible.

The arrangement according to the invention exhibits a further very important advantage. The rectifier 10 and the bias portential 11 and the resistor 12 may be dimensioned so that the entire current flows through the rectifier responsive to reduction of the current through the modulator tube 2 to a value corresponding approximately to the so-called "white value" at "negative modulation." A considerable overcontrol of the white value can in this manner be avoided.

Changes may be made within the scope and spirit of the appended claim in which is defined what is considered new and desired to have protected by Letters Patent.

We claim:

A high frequency modulator circuit comprising a modulator tube having a cathode, a control electrode connected with a source of modulating frequency, and an anode, a high-frequency amplifier tube having a cathode, a control electrode connected with a source of carrier frequency, and an anode, the cathode of said amplifier tube being operatively connected to the anode of said modulator tube as a load for the latter, an anode voltage supply source operatively connected to said amplifier anode and modulator cathode, whereby said modulator and amplifier tubes are in series across said voltage supply, a rectifier operatively connected to the anode of said modulator tube, a current source and a resistor operatively connected in series with said rectifier and therewith extending in series between the anode and cathode of said modulator tube and forming an auxiliary load therefor, the values, and polarity if any, of the components of said auxiliary load being based upon the conduction characteristics of said amplifier tube so that said rectifier begins to conduct when the operation of said high-frequency amplifier tube reaches the range of lower values of mutual conductance on its characteristic curve to provide an increase in effective load on said modulator tube through said auxiliary load for offsetting a decrease in the effective load on the modulator tube through said amplifier tube as a result of reduced mutual conductance of the amplifier tube, thereby tending to stabilize the output frequency of the modulator carrier.

References Cited in the file of this patent

UNITED STATES PATENTS

| | | |
|---|---|---|
| 1,859,024 | Buschbeck | May 17, 1932 |
| 2,240,289 | Dillenburger et al. | Apr. 29, 1941 |
| 2,263,276 | Pulley | Nov. 18, 1941 |
| 2,449,998 | Hansen | Sept. 28, 1948 |
| 2,493,484 | Franklin | Jan. 3, 1950 |
| 2,516,135 | Moore | July 25, 1950 |
| 2,535,912 | Frank et al. | Dec. 26, 1950 |
| 2,717,931 | Duke | Sept. 13, 1955 |

FOREIGN PATENTS

| | | |
|---|---|---|
| 375,725 | Great Britain | June 30, 1932 |